US010059040B2

(12) United States Patent
Ohta (10) Patent No.: US 10,059,040 B2
(45) Date of Patent: Aug. 28, 2018

(54) METHOD FOR MOLDING INTERIOR AND EXTERIOR MEMBERS OF VEHICLES

(71) Applicant: REYDEL AUTOMOTIVE B.V., KN Baarn (NL)

(72) Inventor: Tadashi Ohta, Hiroshima (JP)

(73) Assignee: REYDEL AUTOMOTIVE B.V., KN Baarn (NL)

( * ) Notice: Subject to any disclaimer, the term of this patent is extended or adjusted under 35 U.S.C. 154(b) by 254 days.

(21) Appl. No.: 14/644,569

(22) Filed: Mar. 11, 2015

(65) Prior Publication Data

US 2015/0258715 A1    Sep. 17, 2015

(30) Foreign Application Priority Data

Mar. 12, 2014    (JP) ................................ 2014-048925

(51) Int. Cl.
*B29C 33/38*    (2006.01)
*B29C 45/26*    (2006.01)
(Continued)

(52) U.S. Cl.
CPC .......... *B29C 33/38* (2013.01); *B29C 33/3835* (2013.01); *B29C 33/424* (2013.01);
(Continued)

(58) Field of Classification Search
CPC . B29C 33/38; B29C 45/2602; B29C 33/3835; B29C 33/424; B29C 45/372; B29L 2031/3041
(Continued)

(56) References Cited

U.S. PATENT DOCUMENTS 5,759,588 A * 6/1998 Harada ................... B29C 33/12
264/266
5,968,437 A * 10/1999 Harada ............... B29C 45/1418
264/266
(Continued)

FOREIGN PATENT DOCUMENTS

CA    2569002 A1    5/2006
EP    0947899 A2    10/1999
(Continued)

OTHER PUBLICATIONS

European Search Report dated Jul. 14, 2015.

*Primary Examiner* — Nahida Sultana
(74) *Attorney, Agent, or Firm* — Dickinson Wright PLLC (57) ABSTRACT

A method for molding interior and exterior members of vehicles is provided. By the method, high quality interior and exterior members having surfaces on which general surface shape of genuine leather skin and fine shape such as stitch are formed can be molded by use of a mold. The method for molding the interior and exterior members of vehicles of the present invention comprises the steps of: creating a master model of the interior and exterior members; acquiring three-dimensional data of the created master model of the interior and exterior members; generating surface data which indicates a surface shape of the master model of the interior and exterior members from the acquired three-dimensional data; making the cavity plate of the mold based on the generated surface data; transferring the surface shape of the master model of the interior and exterior members in a resin sheet, attaching on the cavity plate of the mold the resin sheet to which the surface shape of the master model has been transferred; and molding the interior and exterior members by using the cavity plate on which the resin sheet is attached.

12 Claims, 7 Drawing Sheets

(51) Int. Cl.
*B29C 33/42* (2006.01)
*B29C 45/37* (2006.01)
*B29L 31/30* (2006.01)

(52) U.S. Cl.
CPC ........ *B29C 45/2602* (2013.01); *B29C 45/372* (2013.01); *B29L 2031/3041* (2013.01)

(58) Field of Classification Search
USPC ............... 425/375, 174.4; 264/308, 434, 112
See application file for complete search history.

(56) References Cited

U.S. PATENT DOCUMENTS

| | | | |
|---|---|---|---|
| 6,270,712 B1* | 8/2001 | Shoji | B29C 33/424 249/103 |
| 8,377,360 B2* | 2/2013 | Nye | B41J 3/4073 264/308 |
| 2004/0075809 A1* | 4/2004 | Wildsmith | G05B 19/4097 351/159.74 |
| 2005/0274695 A1 | 12/2005 | Carlson | |
| 2007/0018350 A1 | 1/2007 | Brant | |
| 2007/0038531 A1* | 2/2007 | Lukis | G06Q 10/04 705/26.4 |
| 2007/0092595 A1* | 4/2007 | Yoshino | B29C 33/02 425/547 |
| 2007/0095795 A1* | 5/2007 | Drees | B23H 9/00 219/69.11 |
| 2007/0170607 A1* | 7/2007 | Eiha | B29C 45/2606 264/1.1 |
| 2011/0068502 A1* | 3/2011 | Basseas | B29C 33/0016 264/219 |
| 2012/0093674 A1* | 4/2012 | Abe | B29C 67/0077 419/7 |
| 2014/0335218 A1* | 11/2014 | Shim | B29C 33/38 425/547 |
| 2015/0343682 A1* | 12/2015 | Kring | B29C 43/02 156/245 |

FOREIGN PATENT DOCUMENTS

| | | |
|---|---|---|
| EP | 2481545 A1 | 8/2012 |
| JP | S63-41116 | 2/1988 |
| JP | H3-138114 | 6/1991 |
| JP | 2004-15509 | 1/2004 |
| JP | 2004-106049 | 4/2004 |
| JP | 2009078459 A | 4/2009 |
| JP | 2012-20297 | 2/2012 |
| JP | 2012-240309 | 12/2012 |
| JP | 2013-043571 | 3/2013 |
| JP | 2013-151134 | 8/2013 |
| WO | 0126498 A1 | 4/2001 |

* cited by examiner

METHOD FOR MOLDING INTERIOR AND EXTERIOR MEMBERS OF VEHICLES

CROSS-REFERENCE TO PRIOR APPLICATIONS

This U.S. Patent Application claims the benefit of Japanese Patent Application No. 2014-048925, filed Mar. 12, 2014, entitled "Method for Molding Interior and Exterior Members of Vehicles," the entire disclosure of the application being considered part of the disclosure of this application and hereby incorporated by reference.

FIELD OF THE INVENTION

The present invention relates to a method for molding interior and exterior members of vehicles, especially, to a method for molding the interior and exterior members of vehicles by using a mold having a cavity plate.

BACKGROUND OF THE INVENTION

A vehicle (including a four-wheel vehicle and a motorcycle) is provided with interior and exterior members including, for example, interior members such as an instrument panel and a door trim and exterior members such as a seat of a motorcycle. The interior and exterior members comprise a substrate formed into a predetermined shape and a skin material covering the surface of the substrate.

In a luxury car, there are cases in which genuine leather is used as a skin material of interior and exterior members. For example, by sewing together a plurality of genuine leather pieces, it is possible to obtain a skin material that is formed to go along the surface of the substrate. In this case, stitches themselves of a thread that stitches together the leather pieces also enhance the decorativeness of the skin material.

However, when using genuine leather as the skin material as described above, manufacturing cost increases because the materials themselves are expensive and a process of sewing together of the leather pieces is also required. Therefore, resin molded skin materials which express textures of genuine leather by molding synthetic resin materials have also been used (for example, see Patent Documents 1 to 3).

CITATION LIST

Patent Document 1: Japanese Patent Publication No. 2012-240309.
Patent Document 2: Japanese Patent Publication No. 2013-043571.
Patent Document 3: Japanese Patent Publication No. 2013-151134.

SUMMARY OF THE INVENTION

However, the resin molded skin materials in the conventional art as mentioned above merely have just uneven patterns (textures) of predetermined sizes that imitate surface shapes of genuine leather formed repeatedly on the surface of the skin material. Thus, it cannot be said that the resin molded skin materials are adequately reproducing the textures of genuine leather which has random wrinkles and unevenness.

Also, in order to reproduce in a resin molded article fine shapes, such as a thread of stitches made by twining countless fibers, it is necessary to finely machine a mold used for molding the skin material. However, it is actually difficult to form fine shapes on the resin molded skin material by using a mold because there is a limit to precision of machining of the mold and because manufacturing cost of the mold will increase by such fine machining. Therefore, fine shapes such as stitches on the skin material using genuine leather cannot be adequately reproduced in the resin molded skin material, causing its textures to be inferior compared to genuine leather skin material.

The present invention is for solving the problem of the conventional art mentioned above, and its objective is to provide a method for molding interior and exterior members of vehicles which is capable of molding high quality interior and exterior members having surfaces on which general surface shape of genuine leather skin and fine shape such as stitches are formed by use of a mold.

According to an aspect of the invention to accomplish the above-mentioned object, there is provided a method for molding the interior and exterior members of vehicles by using a mold having a cavity plate, the method comprising the steps of: creating a master model of the interior and exterior members; acquiring three-dimensional data of the created master model of the interior and exterior members; generating surface data which indicates a surface shape of the master model of the interior and exterior members from the acquired three-dimensional data; making the cavity plate of the mold based on the generated surface data; transferring the surface shape of the master model of the interior and exterior members to a resin sheet, attaching on the cavity plate of the mold the resin sheet to which the surface shape of the master model has been transferred; and molding the interior and exterior members by using the cavity plate on which the resin sheet is attached.

In the invention configured in this manner, it is possible to reflect the overall surface shape of the master model to the shape of the cavity plate and to reflect fine shape of the surface of the master model to the surface of the resin sheet by generating the surface data which indicates the surface shape of the master model of the interior and exterior members from the three-dimensional data of the master model of the interior and exterior members, making the cavity plate of the mold based on the surface data and attaching on the cavity plate the resin sheet to which the surface shape of the master model has been transferred. Therefore, it is capable of molding high quality interior and exterior members having surfaces on which general surface shape of genuine leather skin and fine surface shape such as stitches are formed by molding the interior and exterior members by using the cavity plate on which the resin sheet is attached.

In addition, in the invention, it is preferable that the step of creating the master model of the interior and exterior members includes forming reference shapes on the master model as references for placement of the interior and exterior members in vehicles, the method further comprising the step of modifying the surface data so that positions of the reference shapes in the generated surface data match positions of the reference shapes when the interior and exterior members are placed in the vehicle, and wherein the step of making the cavity plate of the mold includes making the cavity plate based on the modified surface data.

In the invention configured in this manner, by forming the reference shapes on the master model as references for placement of the interior and exterior members in vehicles, modifying the surface data so that the positions of the reference shapes in the surface data generated from the image of the master model match positions of the reference shapes when the interior and exterior members are placed in the vehicle and making the cavity plate based on the modified surface data, it is possible to revise the size and shape of the surface data so as to match the size and shape of the surface of the designed interior and exterior members and to add position information indicating the position of the surface of the interior and exterior members which are placed in the vehicle, even if the size and shape of the master model are deviated from the size and shape of the designed interior and exterior members. Thus, it is possible to reflect the size and shape of the designed interior and exterior member to the shape of the cavity plate and to use the surface data of the interior and exterior member as a design data of a component which is correlated with other interior and exterior members provided to the vehicle.

In addition, in the invention, it is preferable that the step of creating the master model of the exterior and interior members includes forming four or more reference shapes on the master model.

In the invention configured in this manner, it is possible to revise accurately the size and shape of the surface data so as to match the size and shape of the surface of the designed interior and exterior members even if the size and shape of the master model are shrunk or twisted as compared to the size and shape of the designed interior and exterior members.

In addition, in the invention, it is preferable that the method for molding the interior and exterior members of vehicles further comprises the steps of: acquiring three-dimensional data of the molded interior and exterior members; generating surface data for secondary processing of the molded interior and exterior members which indicates a surface shape of the molded interior and exterior members from the acquired three-dimensional data; and carrying out secondary processing of the molded interior and exterior member based on the generated surface data for secondary processing.

In the invention configured in this manner, it is possible to carry out high-precision secondary processing to which the shape of the molded interior and exterior members is reflected by generating surface data for secondary processing of the molded interior and exterior members from the three-dimensional data of the molded interior and exterior members and carrying out secondary processing of the molded interior and exterior member based on the surface data for secondary processing.

In addition, in the invention, it is preferable that the step of molding the interior and exterior members is the step of molding the interior and exterior members by injection molding of resin.

In the invention configured in this manner, it is possible to spread resin injected in the cavity over fine irregularities of the surface of the resin sheet by high filling pressure, therefore, it is capable of molding high quality interior and exterior members which reproduces general surface shape of genuine leather skin and fine shape such as stitches.

According to the method for molding interior and exterior members of vehicles of the invention, it is capable of molding high quality interior and exterior members which reproduces general surface shape of genuine leather skin and fine shape such as stitches by use of a mold.

BRIEF DESCRIPTION OF DRAWINGS

FIG. 4 is an explanation drawing of a step of forming a center trim of the door trim by the method for molding interior and exterior members of vehicles according to the embodiment of the invention, in which

DETAILED DESCRIPTION OF THE INVENTION

Hereinafter, a method for molding interior and exterior members of vehicles according to the embodiment of the invention will be described with reference to the attached drawings. In the embodiment, a method for molding a center trim of a door trim which is one of the interior and exterior members is described as an example.

First, a center trim of a door trim (interior and exterior member of vehicle) molded by the method for molding interior and exterior members of vehicles according to the embodiment of the invention will be described with reference to FIGS. 1, 2.

Figure 1:
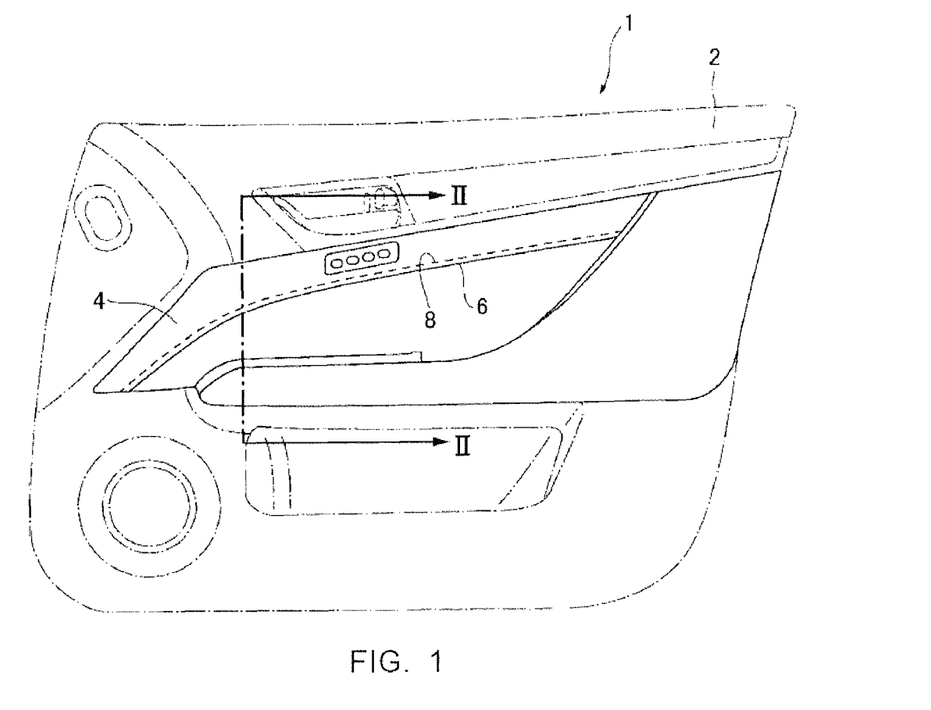
FIG. 1 is a front view of a door trim viewed from the cabin side which is molded by the method for molding interior and exterior members of vehicle according to an embodiment of the invention.
Figure 2:
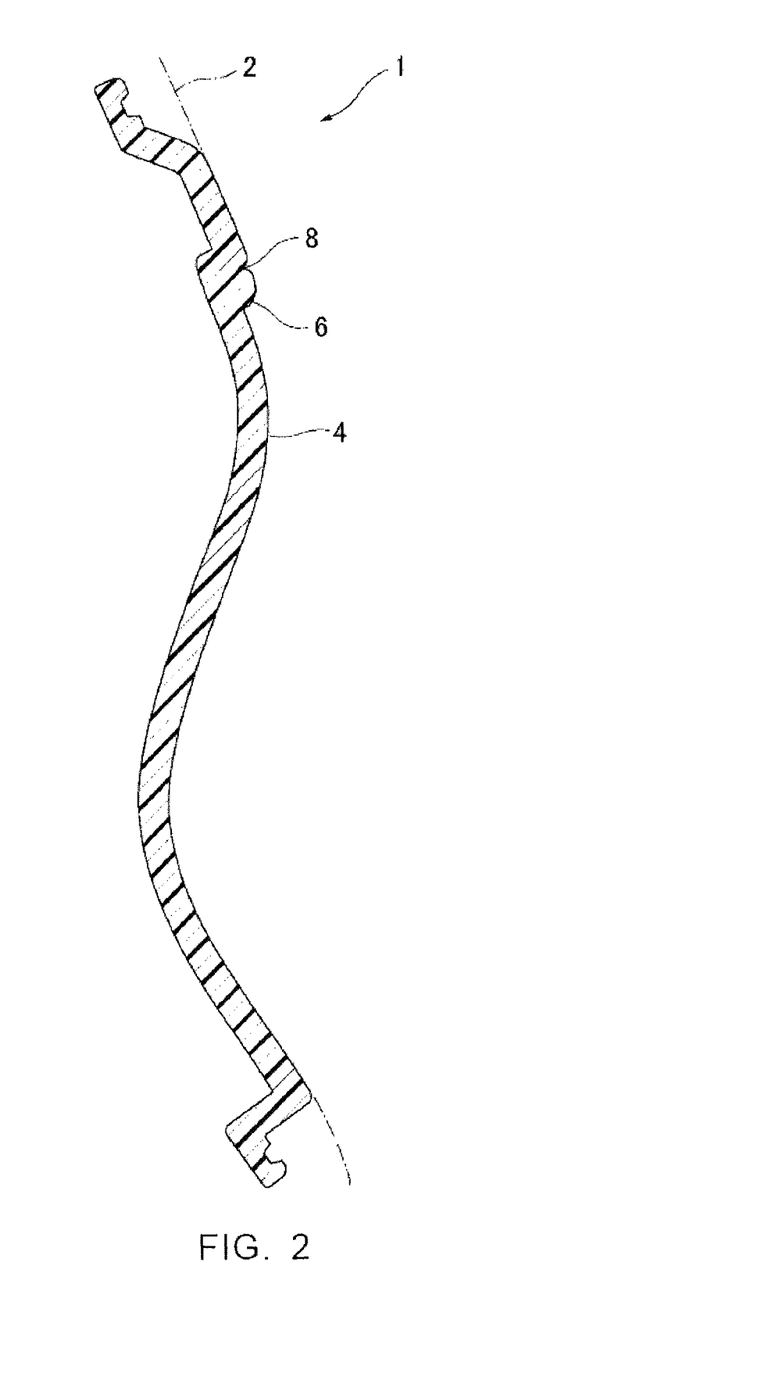
FIG. 2 is a cross-sectional view of the door trim along a line II-II illustrated in FIG. 1.

FIG. 1 is a front view of a door trim viewed from the cabin side which is molded by the method for molding interior and exterior members of vehicle according to an embodiment of the invention and FIG. 2 is a cross-sectional view of the door trim along a line II-II illustrated in FIG. 1.

In FIG. 1, reference numeral 1 indicates a side door of a vehicle. The side door 1 shown in FIG. 1 is a right front side door. The side door 1 is provided with a door panel which forms a side surface of the vehicle, a lifting device mounted on the cabin side of the door panel and a window glass which is liftably supported by the lifting device above the door panel (any one is not shown).

Furthermore, a door trim 2 is mounted so as to cover the lifting device in the cabin side of the door panel.

A center trim 4 made of resin expressing textures of genuine leather is provided at a middle part in vertical direction of the door trim 2. The center trim 4 is formed so as to express a shape in which an end of genuine leather is folded and its end overlaps with another genuine leather and is sewn together. That is, as shown in FIG. 2, a step part 6 expressing the portion in which the folded genuine leather and another genuine leather are overlapped and a stitch part 8 which expresses stitches of a thread sewing these leathers. The center trim 4 is formed by integrally molding a resin (for example, a thermoplastic resin such as polypropylene).

Figure 3:
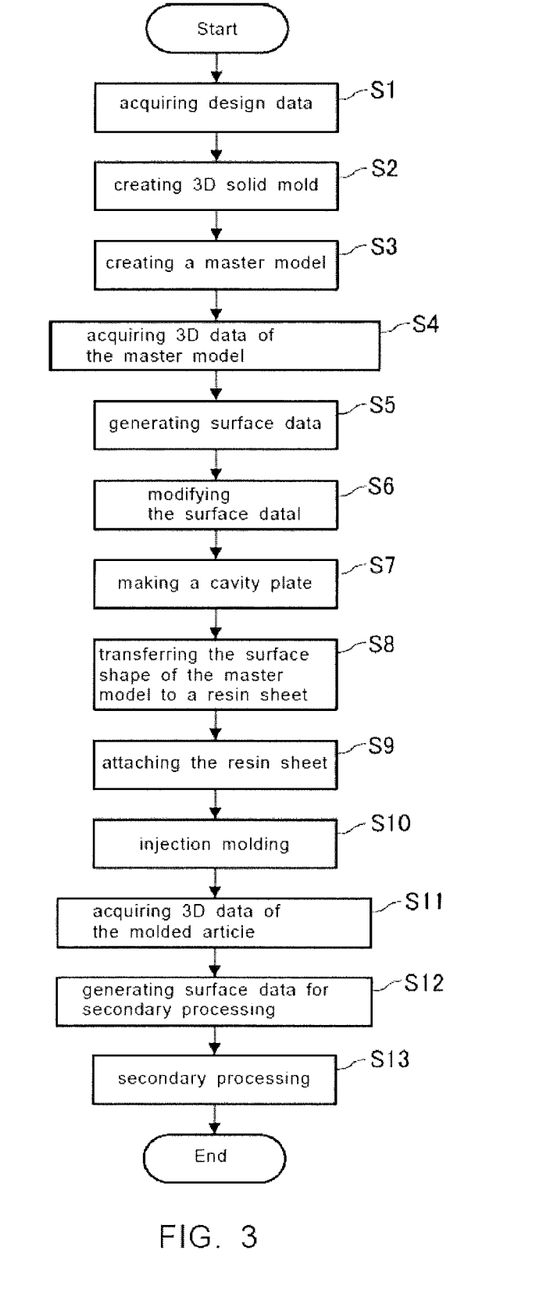
FIG. 3 is a flowchart of the method for molding interior and exterior members of vehicles according to the embodiment of the invention.
Figures 4A, 4B, 4C, 4D, 4E:
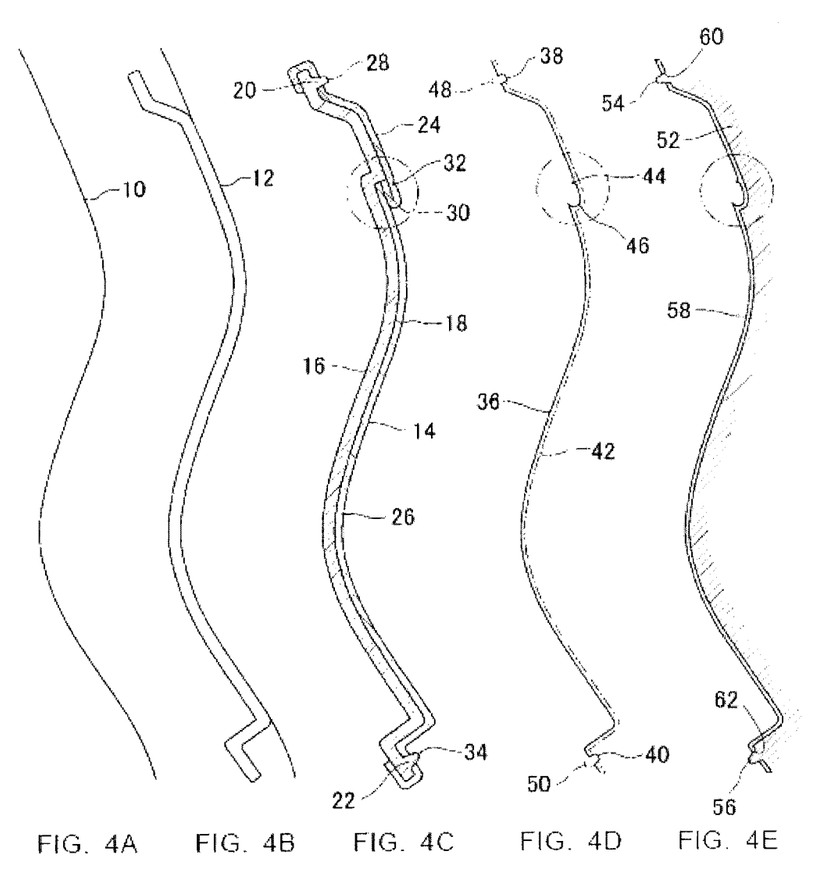
FIG. 4A is a cross-sectional view of a design surface of the center trim.
FIG. 4B is a cross-sectional view of a 3D solid mold of the center trim.
FIG. 4C is a cross-sectional view of a master model of the center trim.
FIG. 4D is a cross-sectional view of a surface data of the center trim and FIG. 4E is a cross-sectional view of a cavity plate of a mold for molding the center trim.
Figure 5:
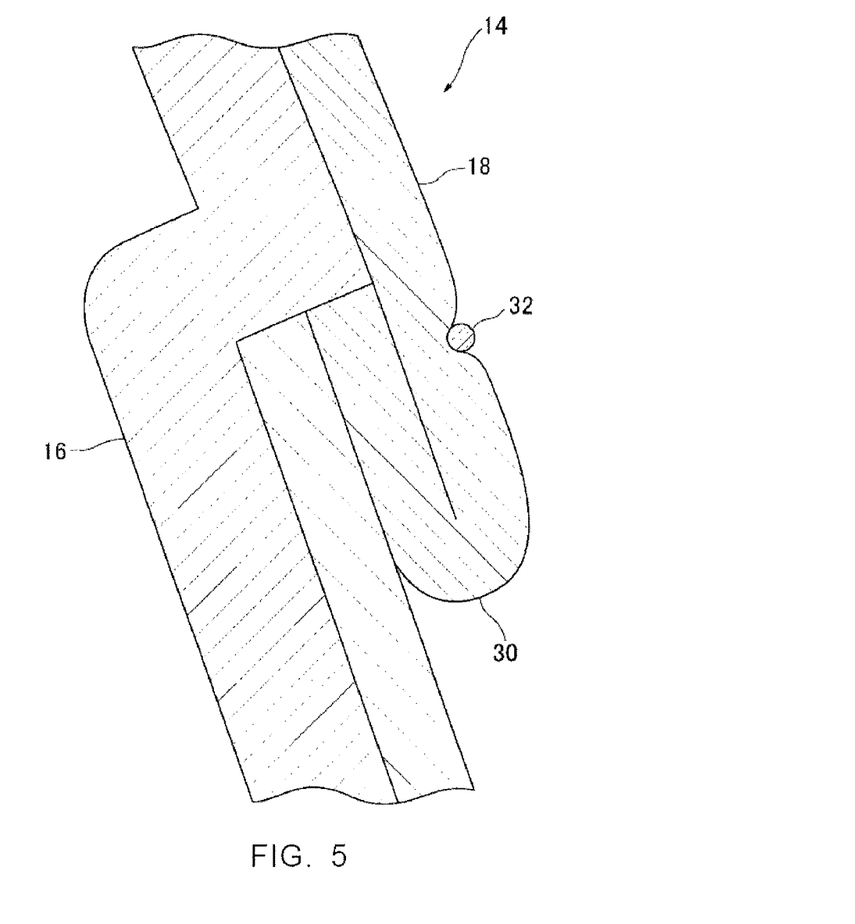
FIG. 5 is a partially enlarged view of a vicinity of the step part of the master model shown in FIG. 4C.
Figure 6:
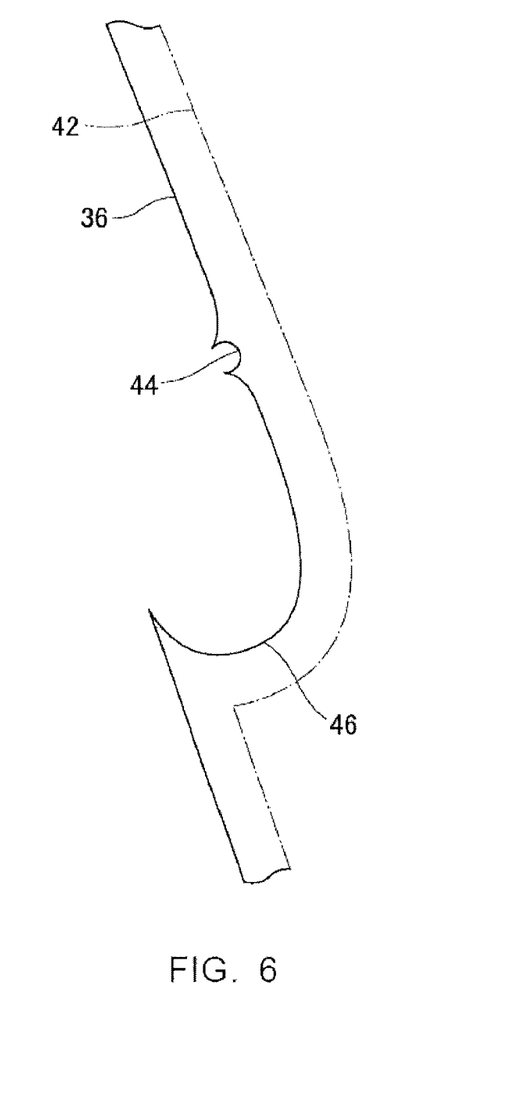
FIG. 6 is a partially enlarged view of a vicinity of the step part of the surface data shown in FIG. 4D.
Figure 7:
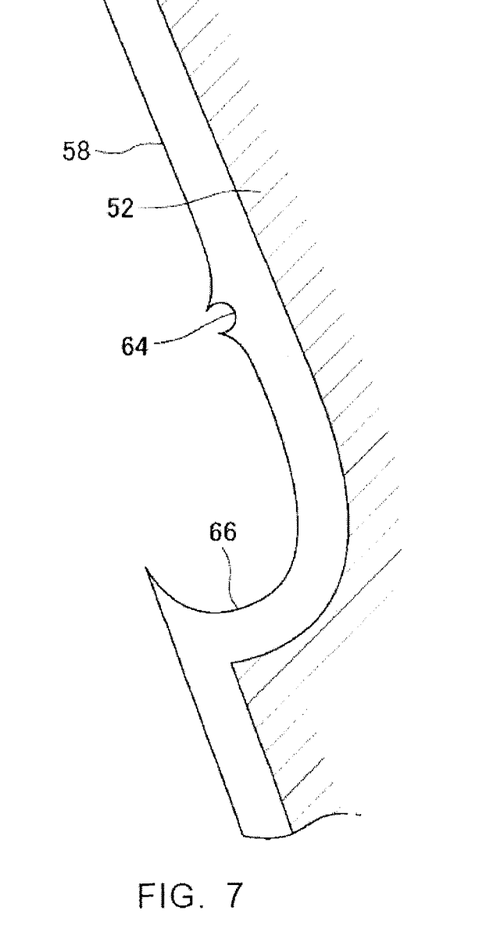
FIG. 7 is a partially enlarged view of a vicinity of the step part of the cavity plate shown in FIG. 4E.

Next, the method for interior and exterior members of vehicles of the embodiment of the invention will be described with reference to FIGS. 3 to 7. FIG. 3 is a flowchart of the method for molding interior and exterior members of vehicles according to the embodiment of the invention. FIG. 4 is an explanation drawing of a step of forming a center trim of the door trim by the method for molding interior and exterior members of vehicles according to the embodiment of the invention. FIG. 4A is a cross-sectional view of a design surface of the center trim, FIG. 4B is a cross-sectional view of a 3D solid mold of the center trim, FIG. 4C is a cross-sectional view of a master model of the center trim, FIG. 4D is a cross-sectional view of a surface data of the center trim and FIG. 4E is a cross-sectional view of a cavity plate of a mold for molding the center trim. Further, FIG. 5 is a partially enlarged view of a vicinity of the step part of the master model shown in FIG. 4C. FIG. 6 is a partially enlarged view of a vicinity of the step part of the surface data shown in FIG. 4D. FIG. 7 is a partially enlarged view of a vicinity of the step part of the cavity plate shown in FIG. 4E.

First, as shown in FIG. 3, in step S1, design data 10 of the door trim 2 is acquired. The design data 10, as shown in FIG. 4A, is not intended to define the specific structure of the door trim 2, but is provided as a surface data defining the contour of the surface of the door trim 2.

Next, the process proceeds to step S2, based on the design data 10 acquired in step S1, solid data (3D solid mold 12) which indicates three-dimensional shape of the center trim 4 of the door trim 2 as shown in FIG. 4B is created.

Next, the process proceeds to step S3, a master model 14 of the center trim 4 is created based on the 3D solid mold 12 of the center trim 4 of the door trim 2 created in step S2. As shown in FIG. 4C, the master model 14 comprises a substrate 16 formed on the basis of the 3D solid mold 12 of the center trim 4, and a skin material 18 covering the substrate 16.

Upper protrusions 20 and lower protrusions 22 of columnar shape (reference shapes), which are references for placement (position, direction, etc.) of the door trim 2 in the vehicle and used for alignment when installing the skin material 18 to the substrate 16, are formed on the substrate 16. The upper projections 20 and the lower protrusions 22 are formed on four or more positions in total. For example, solid data of the substrate 16 is created based on the 3D solid mold 12 of the center trim 4, and the substrate 16 is formed by stereolithography using the solid data.

The skin material 18, as shown in FIG. 4C, comprises an upper skin 24 and a lower skin 26 made of genuine leather. Upper openings 28 are formed in the upper part of the upper skin 24. The upper skin 24 is aligned with the substrate 16 by inserting the upper protrusions 20 of the substrate 16 through the upper openings 28. Further, as shown in FIG. 5, the lower end of the upper skin 24 is folded back to external side (left side in FIG. 5) with a predetermined width, and a step part 30 is formed by placing the folding portion on top of the cabin side (right side in FIG. 5) of the upper end of the lower skin 26.

Moreover, stitches 32 are applied by sewing the overlapped lower end of the upper skin 24 and upper end of the lower skin 26 with threads. Further, lower openings 34 are formed in the lower part of the lower skin 26. The lower skin 26 is aligned with the substrate 16 by inserting the lower protrusions 22 of the substrate 16 through the lower openings 34.

Next, the process proceeds to step S4, three-dimensional data of the master model 14 of the center trim 4 is acquired. Then the process proceeds to step S5, surface data 36 which indicates a surface shape of the master model 14 of the center trim is generated from the three-dimensional data of the master model 14 acquired in step S4.

Specifically, in steps S4 and S5, optical 3D scanning of the master model 14 is performed. That is, a specific pattern is projected from a projector to the master model 14, and the master model 14 is photographed from a plurality of positions by cameras which are placed near the projector. Then, based on distortion of the projected pattern in the captured image, respective positions of point group of the surface of the master model 14 are identified by the principle of triangulation, and a set of position coordinates of the point group is acquired as point group data (three-dimensional data). Furthermore, by combining the point group data, polygon data of the 3D scanned master model 14, that is, the surface data 36 which indicates the surface shape of the master model 14 of the center trim 4 is generated.

Next, the process proceeds to step S6, the surface data 36 is modified so that positions of upper protrusions 38 and lower protrusions 40 (reference shapes) in the surface data 36 generated in step S5 match positions of the upper protrusions and the lower protrusions on the center trim 4 of the door trim which is placed in the vehicle.

For example, if the solid data of the substrate 16 is created based on the 3D solid mold of the center trim 4 created in step S2 and the substrate 16 is formed by stereolithography using the solid data, the size of the substrate 16 may be smaller than the solid data or the shape of the substrate 16 may be twisted caused by shrinkage of resin used in stereolithography. In this case, positions of the upper protrusions 20 and the lower protrusions 22 of the master model 14 also move in response to changes in the size and shape of the substrate 16, and the moved positions are reflected to the surface data 36 generated in step S5. Therefore, the size, shape and position coordinates of the surface data 36 are modified so that the positions of the upper protrusions 38 and the lower protrusions 40 in the surface data 36 match positions of the upper protrusions and the lower protrusions on the center trim 4 of the door trim 2 which is properly placed in the vehicle. In this way, the size and shape of the surface data 36 of the center trim 4 are revised so as to match the size and shape of the surface of the designed center trim 4 and position information indicating the position of the surface of the center trim 4 which is placed in the vehicle is added to the surface data 36, and therefore it is possible to use the surface data 36 of the center trim 4 as a design data of a component which is correlated with other interior and exterior members provided to the vehicle.

Further, as shown in FIG. 4D, in step S6, the shape of the surface data 36 generated in step S5 is modified to a shape which is offset to the cabin side (right side in FIG. 4D). Width of the offset corresponds to thickness of a resin sheet which is attached on a cavity plate (fixed die plate) of a mold for molding the center trim 4 (details will be described later).

FIG. 4D shows the shape of the surface data 36 generated in step S5 by a solid line and the shape of the surface data 42 offset in step S6 by a dashed line.

When the shape of the surface data 36 generated in step S5 is offset, regarding irregularities having height smaller than the offset width (i.e. the thickness of the resin sheet attached on the cavity plate of the mold), irregularities in the surface data 36 are modified to a planar shape. This is because such fine irregularities will be formed by the resin sheet described above.

For example, as shown in FIG. 6, because height of irregularities of a stitch part 44 of the surface data 36 corresponding to the stitches 32 of the master model 14 is smaller than the offset width of the surface data 36, the stitch part 44 is modified to a planar shape when the shape of the surface data 36 is offset. On the other hand, because height of irregularities of a step part 46 of the surface data 36 corresponding to the step part 30 of the master model 14 is greater than the offset width of the surface data 36, the step part 46 is offset while retaining its shape when the shape of the surface data 36 is offset.

Further, in the step S6, the shapes of the upper protrusions 38 and the lower protrusions 40 in the surface data 36 generated in step S5 are changed. Specifically, as shown in FIG. 4D, the shapes of the upper protrusions 38 and the lower protrusions 40 in the surface data 36 are changed so as to protrude to the external side (left side in FIG. 4D). FIG. 4D shows the upper protrusions 38 and the lower protrusions 40 in the surface data 36 generated in step S5 by solid lines, the upper protrusions 48 and the lower protrusions 50 in the surface data 42 modified in step S6 by dashed lines.

Then, the process proceeds to step S7, the cavity plate 52 of the mold used for molding the center trim 4 is made based on the surface data 42 of the center trim 4 modified in step S6. That is, as shown in FIG. 4E, the cavity plate 52 in the form of an inverted shape of the surface shape of the center trim 4 is formed by machining a metal material based on the surface data 42 modified in step S6. Upper protrusions 54 corresponding to the upper protrusions 48 in the surface data 42 whose shape is modified in step S6 are formed on an upper part of the cavity plate 52, and lower protrusions 56 corresponding to the lower protrusions 50 in the surface data 42 whose shape is modified in step S6 are formed on a lower part of the cavity plate 52. As described above, because the surface data 42 of the center trim 4 modified in step S6 is offset by the thickness of the resin sheet 58 from the surface of the center trim 4 which is placed in the vehicle, the surface of the cavity plate 52 is offset in shape by the thickness of the resin sheet 58 from the position of the surface of the center trim 4.

Next, the process proceeds to step S8, the surface shape of the master model 14 is transferred to the resin sheet 58. Specifically, the resin sheet 58 in a semi-cured state is formed by heating epoxy resin mixed with ceramic whiskers, and the resin sheet 58 is superposed and pressed on the surface of the master model 14. In this way, fine irregularities on the entire surface of the skin material 18 of the master model 14, such as a complex surface shape of the skin material 18 made of genuine leather and the thread of the stitches 32 made by twining countless fibers, are transferred to the surface of the resin sheet 58. As the resin sheet 58, for example, Serashibo (registered trademark) of Tanazawa Hakkosha Co., Ltd. can be used.

After step S8, the process proceeds to step S9, the resin sheet 58 to which the surface shape of the master model 14 has been transferred in step S8 is attached on the cavity plate 52 made in step S7. As shown in FIG. 4E, upper openings 60 are formed in an upper part of the resin sheet 58 corresponding to the upper protrusions 20 of the master model 14, and lower openings 62 are formed in a lower part of the resin sheet 58 corresponding to the lower protrusions 22 of the master model 14. The resin sheet 58 is aligned with the cavity plate 52 by inserting the upper protrusions 54 of the cavity plate 52 through the upper openings 60 and inserting the lower protrusions 56 of the cavity plate 52 through the lower openings 62. Then, the resin sheet 58 is cured by heating the whole resin sheet 58 in a state of being aligned with the cavity plate 52.

As described above, the surface of the cavity plate 52 is offset in shape by the thickness of the resin sheet 58 from the position of the surface of the center trim 4. Therefore, the surface shape of the resin sheet 58 corresponds to the surface shape of the center trim 4 by attaching the resin sheet 58 on the surface of the cavity plate 52. For example, as shown in FIG. 7, the resin sheet 58 is attached on the cavity plate 52 made on the basis of the surface data 42 which is offset in step S6. The surface of the resin sheet 58 is formed as stitch parts 64 in the form of an inverted shape of the surface shape of the stitches 32 of the master model 14 and a step part 66 in the form of an inverted shape of the surface shape of the step part 30 of the master model 14.

Next, the process proceeds to step S10, the center trim 4 is injection-molded by using the cavity plate 52 to which the resin sheet 58 is attached in step S9. During this injection-molding, the cavity plate 52 is preferably heated by a heater to increase surface temperature of the resin sheet 58 so that resin injected in a cavity of the mold and being in contact with the resin sheet 58 becomes flexible and spreads enough over fine irregularities of the surface of the resin sheet 58.

Subsequently, the process proceeds to step S11, three-dimensional data of the center trim 4 which is injection-molded in step S10 is acquired, and subsequently proceeds to step S12, surface data for secondary processing of the injection-molded center trim 4 which indicates a surface shape of the center trim 4 is generated from the three-dimensional data of the center trim 4 acquired in step S11.

Specifically, in steps S11 and S12, similarly to steps S4 and S5, optical 3D scanning of the injection-molded center trim 4 is performed. In this way, the surface data to which the shape of the actually molded center trim 4 is reflected is generated.

Next, the process proceeds to step S13, the center trim 4 which is injection-molded in step S10 is secondary processed based on the surface data for secondary processing generated in step S12. For example, based on the surface data for secondary processing generated in step S12, a position of the stitch part 8 in the injection-molded center trim 4 is specified and a coloring process is performed on the stitch part 8. In addition, it is possible to carry out secondary processing including various machining, chemical treatment or the like to the center trim 4. Upon completion of the secondary processing, the center trim 4 is completed.

Then, further modifications of the embodiment of the invention will be described.

In the above embodiment, in step S8 of the process of molding the center trim 4 of the door trim 2, the surface shape of the master model of the center trim 4 is transferred to the resin sheet 58. If the surface shape of the master model 14 includes sharp concave shapes such as narrow and deep grooves and elongated hole, inverted shapes of these shapes, namely, sharp convex shapes such as narrow and high wall-like protrusions and elongated columnar protrusions, will be formed on the resin sheet 58. If the injection-molding of the center trim 4 is performed by using the mold in which such a resin sheet 58 is attached on the cavity plate 52, the sharp convex shapes formed on the resin sheet 58 may be damaged by pressure of the resin filled in the cavity.

Therefore, when the shape of the surface data 36 generated in step S5 of the process of molding the center trim 4 of the door trim 2 is modified to a shape which is offset by the thickness of the resin sheet 58 in step 6, the shape of the surface data is retained without offset at positions corresponding to the sharp concave shapes in the surface shape of the master model 14. Thus, in step S7, when the cavity plate 52 is machined based on the surface data 42 of the center trim 4 modified in step 6, sharp convex shapes which are inverted shapes of the sharp concave shapes in the surface shape of the master model 14 are formed on the cavity plate 52 at positions corresponding to the sharp concave shapes in the surface shape of the master model 14. Further, in step S8, an area excluding portions of the sharp concave shapes from the surface shape of the master model 14 is transferred to the resin sheet 58. Then, the center trim 4 is injection-molded by using the mold in which the resin sheet 58 is attached on the cavity plate 52. In this case, because the sharp convex shapes corresponding to the sharp concave shapes in the surface shape of the master model 14 are formed on the cavity plate 52 of high strength, it is possible to prevent the sharp convex shapes from being damaged by the pressure of the resin filled in the cavity. Further, regarding the area excluding portions of the sharp concave shapes from the surface shapes of the master model 14, because even fine irregularities are reflected to the resin sheet 58, the textures of the surface of the master model 14 can be reproduced on the surface of the center trim 4 which is injection-molded.

In the above embodiment, in steps S4 and S5 of the process of molding the center trim 4 of the door trim 2, it is described that the surface data 36 of the center trim 4 is generated by performing optical 3D scanning of the master model 14. However, the surface data 36 of the center trim 4 may be generated by other methods different from the optical 3D scanning. For example, point group data of the surface of the master model 14 may be acquired by using a 3D laser scanner and the surface data 36 of the center trim 4 may be generated based on the point group data. Further, in steps S11 and S12 similarly to steps S4 and S5, point group data of the surface of the injection-molded center trim 4 may be acquired by using a 3D laser scanner and the surface data for secondary processing of the center trim 4 may be generated based on the point group data.

Further, in the embodiment described above, although it is described that the center trim 4 is injection-molded in step S10 of the process of molding the center trim 4 of the door trim, the method for molding interior and exterior members of vehicle according to the invention may be applied to various molding methods using molds such as sheet forming, vacuum forming, pressure forming, slush molding etc. other than injection molding.

Further, in the above-mentioned embodiment, although a case of molding the center trim 4 made of a resin expressing textures of genuine leather is described, the method for molding interior and exterior members of vehicle according to the invention may be used for molding interior and exterior members reproducing fine surface shapes of any material such as cloth, paper etc. other than genuine leather.

Next, effects of the method for molding interior and exterior members of vehicle according to the embodiment of the invention and the modifications of the embodiment of the invention will be described.

First, it is possible to reflect the overall surface shape of the master model 14 to the shape of the cavity plate 52 and to reflect fine shape of the surface of the master model 13 to the surface of the resin sheet 58 by generating the surface data 36 which indicates the surface shape of the master model 14 of the center trim 4 (interior and exterior members) from the three-dimensional data of the master model 13 of the center trim 4, making the cavity plate 52 of the mold based on the surface data 36 and attaching on the cavity plate 52 the resin sheet 58 to which the surface shape of the master model 14 has been transferred. Therefore, it is capable of molding high quality center trim 4 having surfaces on which general surface shape of genuine leather skin and fine surface shape such as stitches are formed by molding the center trim 4 by using the cavity plate 52 on which the resin sheet 58 is attached.

Further, by forming the upper protrusions 20 and the lower protrusions 22 (reference shapes) on the master model 14 as references for placement of the center trim 4 in vehicles, modifying the surface data 36 so that the positions of the upper protrusions 38 and the lower protrusions 40 (reference shapes) in the surface data 36 generated from the image of the master model 14 match positions of the reference shapes when the center trim 4 which is placed in the vehicle and making the cavity plate 52 based on the modified surface data 42, it is possible to revise the size and shape of the surface data 36 so as to match the size and shape of the surface of the designed center trim 4 and to add position information indicating the position of the surface of the center trim 4 which are placed in the vehicle, even if the size and shape of the master model 14 are deviated from the size and shape of the designed center trim 4. Thus, it is possible to reflect the size and shape of the designed center trim 4 to the shape of the cavity plate 52 and to use the surface data 42 as a design data of a component which is correlated with other interior and exterior members provided to the vehicle.

In particular, by forming four or more upper protrusions 20 and lower protrusions 22 (reference shapes) on the master model 14, it is possible to revise accurately the size and shape of the surface data 36 so as to match the size and shape of the surface of the designed center trim 4 even if the size and shape of the master model 14 are shrunk or twisted as compared to the size and shape of the designed center trim 4.

Further, it is possible to carry out high-precision secondary processing to which the shape of the molded center trim 4 is reflected by generating surface data for secondary processing of the center trim 4 from the three-dimensional data of the molded center trim 4 and carrying out secondary processing of the molded center trim 4 based on the surface data for secondary processing.

Further, by molding the center trim 4 by injection molding, it is possible to spread resin injected in the cavity over fine irregularities of the surface of the resin sheet 58 by high filling pressure, therefore, it is capable of molding high quality center trim 4 which reproduces general surface shape of genuine leather skin and fine shape such as stitches.

What is claimed is:

1. A method for molding interior and exterior members of vehicles by using a mold having a cavity plate, the method comprising the steps of:

creating a master model of the interior and exterior members, including forming reference shapes on the master model as references for placement of the interior and exterior members in vehicles, and including forming fine surface irregularities on the master model;

acquiring three-dimensional data of the created master model of the interior and exterior members;

generating surface data which indicates a surface shape of the master model of the interior and exterior members from the acquired three-dimensional data;

modifying the surface data so that positions of the reference shapes in the generated surface data match positions of the reference shapes when the interior and exterior members are placed in vehicles;

making the cavity plate of the mold based on the modified surface data;

transferring the surface shape and the fine surface irregularities of the master model of the interior and exterior members to a resin sheet by superposing and pressing said resin sheet on the surface of the master model;

attaching the resin sheet to which the surface shape and fine surface irregularities of the master model have been transferred onto the cavity plate of the mold; and molding the interior and exterior members by using the cavity plate on which the resin sheet is attached.

2. The method for molding interior and exterior members of vehicles according to claim 1, wherein the step of creating the master model includes:
acquiring design data of the contour of the surface of the interior and exterior members;
creating a 3D solid mold based on the design data;
forming a substrate on the basis of the 3D solid mold; and
providing a skin material including the fine surface irregularities and covering the substrate with said skin material in order to constitute the master model.

3. The method for molding interior and exterior members of vehicles according to claim 1, wherein the step of creating the master model of the interior and exterior members includes forming four or more reference shapes on the master model.

4. The method for molding interior and exterior members of vehicles according to claim 1, further comprising the steps of:
acquiring three-dimensional data of the molded interior and exterior members;
generating surface data for secondary processing of the molded interior and exterior members which indicates a surface shape of the molded interior and exterior members from the acquired three-dimensional data; and
carrying out secondary processing of the molded interior and exterior member based on the generated surface data for secondary processing.

5. The method for molding interior and exterior members of vehicles according to claim 1, wherein the step of molding the interior and exterior members is the step of molding the interior and exterior members by injection molding of resin.

6. The method for molding interior and exterior members of vehicles according to claim 1, wherein the step of modifying the surface data also includes offsetting the surface shape with an offset corresponding to the thickness of the resin sheet to be attached to the cavity plate.

7. The method for molding interior and exterior members of vehicles according to claim 2, wherein the skin material is made of genuine leather, by sewing together an upper skin and a lower skin, the fine surface irregularities of the leather and the thread of the stitches being transferred to the surface of the resin sheet when the latter is pressed, in a semi cured state, on the surface of the master model.

8. The method for molding interior and exterior members of vehicles according to claim 7, wherein the molded members are center trims of vehicle doors and wherein the step of molding said center trims by using the cavity plate on which the resin sheet is attached includes heating said cavity plate to increase the temperature of the resin sheet so that the molding resin injected into the cavity of the mold spreads over the fine surface irregularities of the surface of the resin sheet.

9. The method for molding interior and exterior members of vehicles according to claim 1, wherein the step of making the cavity plate comprises machining of metal material.

10. A method for molding interior and exterior members of vehicles by using a mold having a cavity plate, the method comprising the steps of:
creating a master model of the interior and exterior members, including forming reference shapes on the master model as references for placement of the interior and exterior members in vehicles;
acquiring three-dimensional data of the created master model of the interior and exterior members;
generating surface data which indicates a surface shape of the master model of the interior and exterior members from the acquired three-dimensional data;
modifying the surface data so that positions of the reference shapes in the generated surface data match positions of the reference shapes when the interior and exterior members are placed in vehicles;
making the cavity plate of the mold based on the modified surface data;
transferring the surface shape of the master model of the interior and exterior members to a resin sheet by superposing and pressing said resin sheet on the surface of the master model;
attaching the resin sheet to which the surface shape of the master model has been transferred onto the cavity plate of the mold;
molding the interior and exterior members by using the cavity plate on which the resin sheet is attached;
wherein the step of creating the master model includes:
acquiring design data of the contour of the surface of the interior and exterior members;
creating a 3D solid mold based on the design data;
forming a substrate on the basis of the 3D solid mold; and
providing a skin material and covering the substrate with said skin material in order to constitute the master model.

11. The method for molding interior and exterior members of vehicles according to claim 1 wherein the resin sheet is connected to the cavity plate throughout molding of the interior and exterior members by using the cavity plate.

12. A method for molding interior and exterior members of vehicles by using a mold having a cavity plate, the method comprising the steps of:
creating a master model of the interior and exterior members, including forming reference shapes on the master model as references for placement of the interior and exterior members in vehicles, and including forming fine surface irregularities on the master model;
acquiring three-dimensional data of the created master model of the interior and exterior members;
generating surface data which indicates a surface shape of the master model of the interior and exterior members from the acquired three-dimensional data;
modifying the surface data so that positions of the reference shapes in the generated surface data match positions of the reference shapes when the interior and exterior members are placed in vehicles;
making the cavity plate of the mold based on the modified surface data;
transferring the surface shape and the fine surface irregularities of the master model of the interior and exterior members to a resin sheet by superposing and pressing said resin sheet on the surface of the master model;
attaching the resin sheet to which the surface shape and fine surface irregularities of the master model have been transferred onto the cavity plate of the mold;
molding the interior and exterior members by using the cavity plate on which the resin sheet is attached, wherein the resin sheet is connected to the cavity plate throughout molding of the interior and exterior members.

\* \* \* \* \*